United States Patent [19]

Wickson

[11] 3,968,381

[45] July 6, 1976

[54] ARC TYPE SWITCH

[75] Inventor: Arthur K. Wickson, Palos Verdes Estates, Calif.

[73] Assignee: The Garrett Corporation, Los Angeles, Calif.

[22] Filed: Nov. 25, 1974

[21] Appl. No.: 526,670

[52] U.S. Cl. .............................. 307/137; 317/11 D; 200/148 G; 200/147 R

[51] Int. Cl.$^2$ ..................... H02H 7/22; H01H 33/00

[58] Field of Search .............. 317/11 R, 11 D, 11 B; 307/137, 136; 200/144 R, 148 G, 147 R

[56] References Cited

UNITED STATES PATENTS 3,704,354 11/1972 Lagofun .......................... 200/148 G 3,823,341 7/1974 Pelenc et al. ..................... 317/11 D 3,859,487 1/1975 Berberich ........................ 200/144 R

*Primary Examiner*—Herman Hohauser

*Attorney, Agent, or Firm*—Joel D. Talcott; Albert J. Miller

[57] ABSTRACT

An arc type switch has means to inject an auxiliary plasma between the main switch electrodes with high initial velocity. The switch conduction is initiated through a plasma that is already in motion along the surfaces of the main electrodes thereby reducing localized deterioration of the faces and distributing the localized heating to facilitate cooling of the electrodes. The configuration of the main electrodes is such as to continue forcing the main plasma by electromagnetic action in the same direction as the injected plasma.

20 Claims, 6 Drawing Figures

ARC TYPE SWITCH

BACKGROUND OF THE INVENTION

This invention relates to the field of spark gap technology and specifically to devices that are required to pass very high currents with very high rates of current increase. The invention pertains to an improved device of the character described in which the useful life of the electrodes is greatly increased or the value of ampere-second pulses passed by the switch is greatly increased for a given life.

The switch of the present invention has particular utility in systems that require repetitive current pulses of at least 100,000 A of at least 1 microsec duration, from source voltages of at least 1000 volts. In the present state of the art, a pair of electrodes is limited to a life of about 100,000 discharges when passing current pulses of about 10 microsecs duration and about 100,000 A amplitude. The invention permits significant extension of these values of electrode life or current amplitude or pulse duration or a combination of these parameters.

The utility of spark gap devices is limited by erosion of the electrode surfaces which reduces the life, or number of discharges after which the device becomes inoperative. The rate of erosion increases rapidly as the amplitude of switch current increases.

Erosion and deterioration of electrode surfaces is caused by very localized heating, vaporization, ion bombardment and electromagnetic forces. As this deterioration continues the geometry of the electrodes changes until the switch fails to function under the intended initial operating conditions.

In the past art, electromagnetic sweeping of the arc has been employed to reduce localized erosion. However, in all prior use of this technique the sweeping commences at zero velocity at the instant the arc is formed and increases with time as the electromagnetic force acts on the mass of the plasma. Hence, if the amplitude of the current is large at the start of the current pulse, localized erosion is not reduced at this instant and at the location of the start of the arc.

SUMMARY OF THE INVENTION

The invention described herein includes means for imparting an initial sweep velocity to the arc prior to and during its initial conduction of the current pulse. The invention reduces the localized erosion throughout the full length of sweep of the arc, increases the life of the electrodes and facilitates cooling of the electrodes. The means for imparting the initial velocity to the switch conducting arc is an auxiliary plasma gun that injects a plasma at high velocity between the main electrodes of the switch. The momentum of the auxiliary plasma is transferred to the plasma of the arc between the main electrodes so that this arc commences sweeping the electrodes with a high value of initial velocity.

DESCRIPTION OF THE INVENTION

The principles and detailed operation of the invention are described in more detail with reference to the accompanying drawings that also form part of this disclosure.

FIG. 1 is a diagram that shows the generalized circuit in which the invention may be used. FIG. 2A is a diagram with more details that show the configuration of a prior art switch in a circuit between a charged Pulse Forming Network (PFN) and a load. FIG. 2B is a graph of current flow and sweep velocity of the arc for the circuit and prior art device of FIG. 2A.

Figure 1:
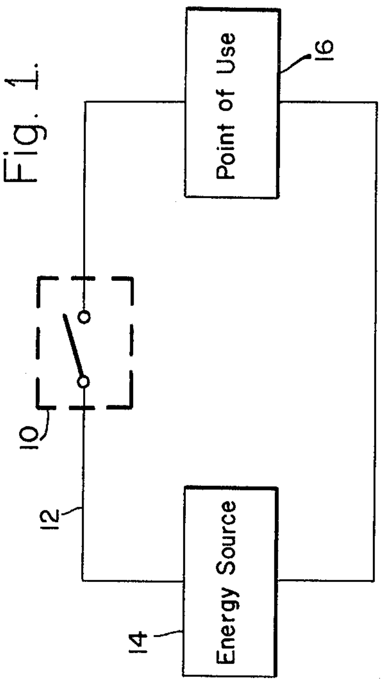

Referring now in detail to FIG. 1, there is shown a highly schematic switch 10 representing the invention, connected into a simple series circuit 12 interconnecting the power supply 14 and some load or point of use 16. This extremely simplified FIG. 1 is representative of any embodiment or environment in which the invention might be used. It is recognized that this same showing is simple enough to include a charged capacitor and a flash lamp but the purpose of the drawing is to graphically illustrate the problem solved by the invention. When the point of use and the energy source are operating at hundreds of thousands of amperes, and the point of use is to be pulsed at relatively high rates, the problem is evident; i.e., transferring such pulses between the energy source 14 and the point of use 16 in such a manner as to not immediately consume the switch 10. It is this problem to which the invention is directed, and which the invention solves in a manner having advantages over prior art solutions.

The advantages are more pronounced if the switched current is required to increase very quickly to its maximum value.

Figure 2A:
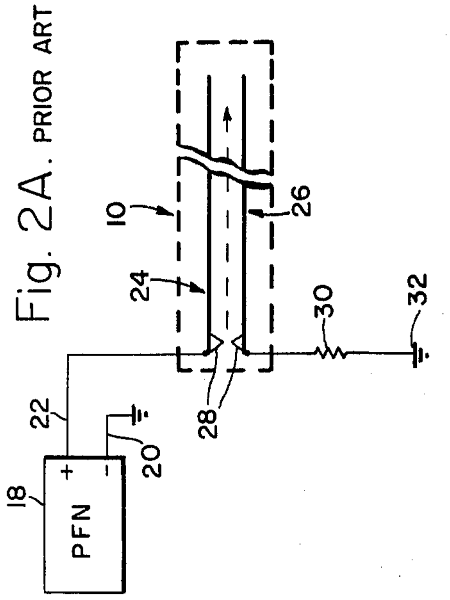
Fig. 2A. PRIOR ART

Referring now to FIG. 2A, there is shown a prior art arrangement, which comprises a charged Pulse Forming Network (PFN) 18 corresponding to the energy source 14 of FIG. 1.

The "PFN" 18 is grounded on one side as indicated by the line 20, and is connected by a line 22 to a switch 10, corresponding to the switch 10 of FIG. 1. Said prior art switch comprises a pair of electrodes 24 and 26, with means, not shown, to hold them in a predetermined spaced relation to each other. At one end of the electrodes, arc inducing or triggering means 28 are provided. The electrodes 24 and 26 may comprise rods, sheets, or other physical forms well known to those skilled in the art. The line 22 connects to one of the electrodes 24, and the other electrode 26 is connected to the resistive load 30 corresponding to the point of use 16 of FIG. 1, and thence the circuit is grounded as indicated at 32. The electrodes 24 and 26 are indicated of indeterminate length in order to show that their length will be determined in accordance with the power rating and pulse duration produced by the PFN 18 in order to allow the plasma to sweep along the length of the electrodes to thereby reduce localized erosion of the electrode surfaces.

Figure 2B:
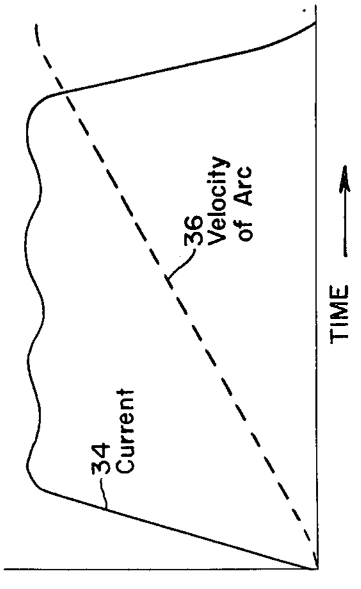
Fig. 2B. PRIOR ART

Referring now to FIG. 2B, there is shown a curve 34, which indicates the relationship of the current through the switch 10 and the load 30 in the prior art embodiment FIG. 2A, and a curve 36 which indicates the velocity of the arc or slug or shot of plasma as it makes its traverse from left to right starting from the trigger 28 between the electrodes 24 and 26. The origin of the curves at the lower left corner corresponds to the activation of the trigger 28 of FIG. 2A. The significance of these curves 34 and 36 will be set forth below in conjunction with the similar showing of FIG. 3B for the invention device. The motion of the plasma from left to right is a result of the electromagnetic forces that result from the magnetic field from the current in the electrodes acting on the current flow through the plasma.

Figure 3A:
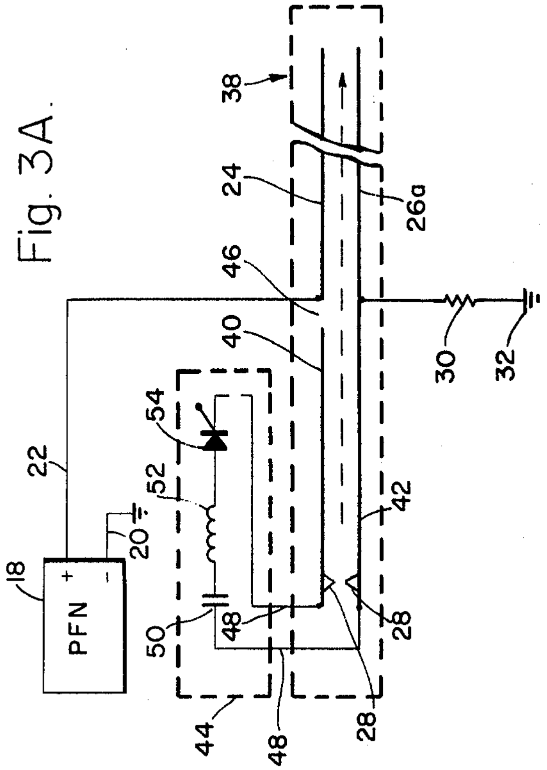
FIGS. 3A and 3B are diagrams similar to FIGS. 2A and 2B respectively with the present invention substituted for the prior art switch. The sweep velocity of the main arc shown in FIG. 3B is seen to commence with a high initial value and to continue increasing in value, thus illustrating the principle and the advantages of the present invention compared with a prior art switch.
Figure 3B:
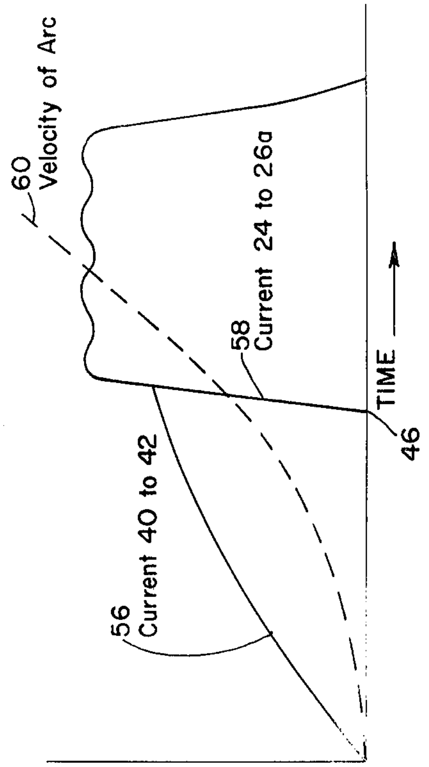

Referring now to FIGS. 3A and 3B, there is shown a switch embodiment of the invention similar to that of FIG. 2A with its performance curves 56, 58 and 60 corresponding to curves 34 and 36 of FIG. 2B, to graphically show the improvement and advantages of the invention over the prior art. Certain parts of the apparatus in FIG. 3A are functionally identical and in some cases physically identical to the corresponding parts shown in FIG. 2A and described above, and accordingly the same reference numerals have been used for such parts, and thus their description need not be repeated.

This embodiment of FIG. 3A comprises a switch 38 corresponding to the switch 10 of FIG. 1, and an arc initiation circuit 44, which has no correspondent in FIG. 2A of the prior art. These two portions 38 and 44 are electrically interconnected by a pair of lines 48. The remaining parts, by and large, are the same as that shown and described above with respect to the prior art.

The switch 38 utilizes the same electrode 24 as the prior art, but the companion electrode 26 is indicated by the legend 26*a*, to indicate that it is extended as at 42. The extended portion 42 has a companion electrode 40 which is separated from the main electrode 24 by a gap 46. The triggering means 28 are provided at the end of the electrodes 40 and 42 furthest from the main electrodes 24 and 26*a*. The components 28, 40 and 42 form the plasma gun. The lines 48 from the arcing circuit 44 connect to the triggering means 28. The load 30 is switched to the PFN through electrodes 24 and 26*a* and the line 22 when the arc between electrodes 40 and 42 is injected from left to right and crosses the gap 46.

The concept and functional requirements of the triggering or arc initiation circuit 44 is indicated by the simple series circuit of a capacitor 50, and inductor 52, and an SCR 54. This simplified showing is intended to illustrate the principle needed; suitable triggering circuits to achieve the desirata and functional requirements, set forth below, are well known and within the skill of routineers in the art. Suitable power supply means, now shown, will, of course, also be provided. Discharge of the capacitor is used to initiate the arc at 28 at a low current, the elements 52 and 50 being provided for the usual purposes of forming a half sinusoidal pulse of current.

The specific waveform of the current generated by the arc initiation circuit is not a unique requirement for the functioning of the invention. The current may even fall to zero before the plasma between electrodes 40 and 42 reaches the electrodes 46 and 26*a* of the switch, and in this case the momentum and ionization of the plasma may remain sufficiently high to maintain the mechanism of injection into the gap between the switch electrodes.

There is also freedom in the design of the plasma gun that comprises components 28, 40 and 42. For example, the inductor 52 may be located close to the electrodes 40 and 42 so that its magnetic field causes an additional force of deflection on the plasma.

Referring now to FIG. 3B, the curve 58 of current between the electrodes 24 and 26*a* closely corresponds to the curve 34 of the FIG. 2B prior art device. The curve 56 of current between the electrodes 40 and 42, however, during the period between spark initiation point and the gap 46, is added by the invention structure to the left of the main electrodes 24 and 26*a*. The significant difference resides in the curve of velocity of the arc 60 as compared to the curve 36 of arc velocity of the prior art. The curve 60 generally represents the speed of the moving plasma as it traverses from end to end starting from the point of initiation of the trigger 28 and ending at the right-hand end of the main electrodes 24 and 26*a*.

The functional requirement is that an arc from the accelerating or initiating means be present and moving at the time that it forms the electrical connection between the switch electrodes 24 and 26*a* and imparts initial velocity to the arc that continues to carry the pulse current in the PFN circuit.

A number of significant advantages can be seen by comparison of the showings of FIGS. 3B and 2B. First, in the invention the arc begins at the trigger 28 at virtually no current, and the current increases quite gradually as the sweep velocity of the arc increases. The slope of the curve 56 should be compared to the initial slope of the curve 34. Because of the much greater steepness of the curve 34 at this point in the prior art configuration where the arc velocity is very low for a short period of time, the current increases very rapidly, thus greatly increasing the damage to the triggering mechanism and the main electrodes themselves at the initiation point. On the other hand, in the present invention, the electrodes 40 and 42, which may be thought of as acceleration means or a plasma gun, creates the current and slowly increases it while at the same time the arc velocity slowly increases. In this manner, the main electrodes are protected from arc initiation entirely, and the harmful effects of the dwell of the plasma or arc at its beginning is minimized in that the current increases slowly and starts from zero.

In both cases FIGS. 2A and 3A, the motion of the plasma between the electrodes from left to right is caused by force on the plasma by the interaction of the magnetic field between the electrodes and the current through the plasma.

The primary advantage of the present invention is illustrated by the intersection of the curve 60 and the one end or rising portion of the curve 58. This intersection corresponds to the origin point 28 of FIG. 2B. It is significant that when the load current commences to flow through the arc, the arc has already a substantial velocity. This is the mechanism by which the invention protects the electrodes 24 and 26*a* from the harmful effects of these heavy currents, thereby increasing the useful life of the switch 38 embodying the invention as compared to prior art switches such as are shown in FIG. 2A.

Figure 4:
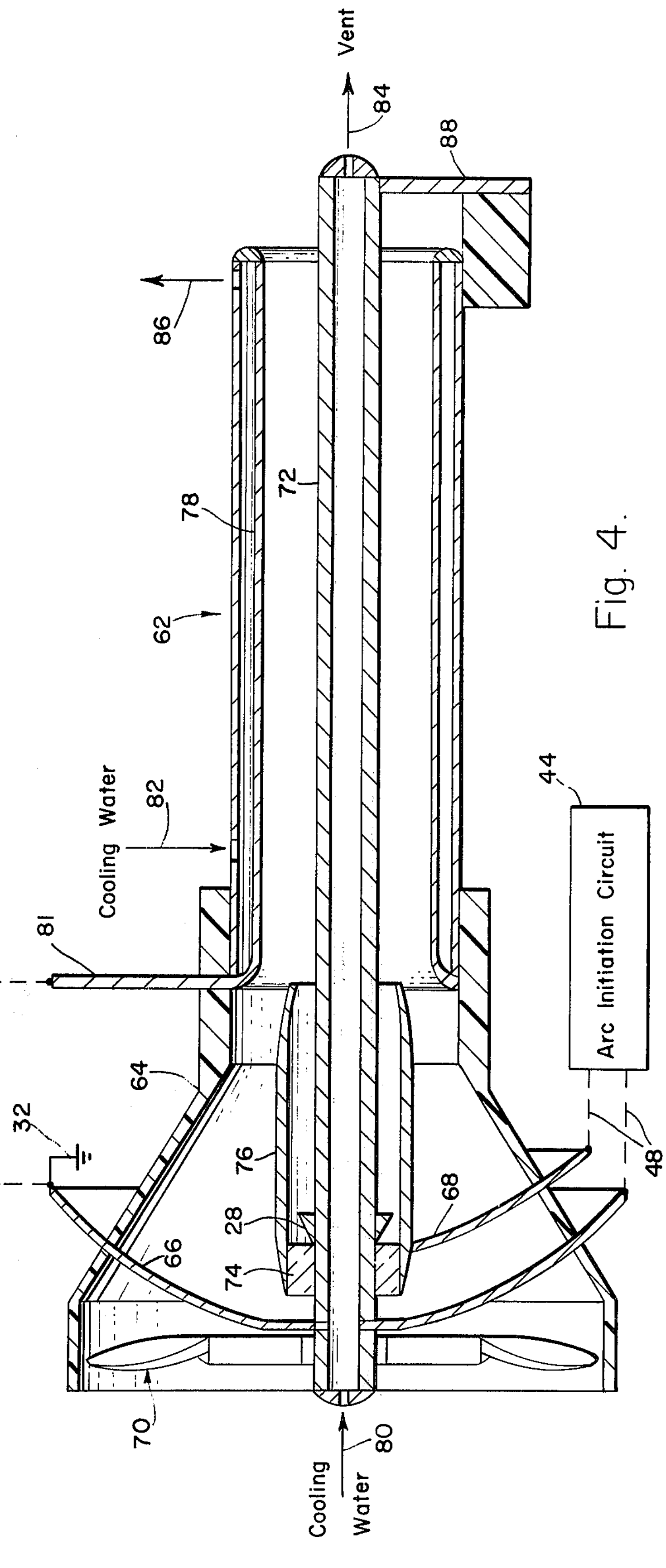
FIG. 4 is a partly schematic and somewhat more detailed showing of a preferred concentric electrode embodiment of the invention in longitudinal cross-sectional view.

A preferred embodiment 62 shown in FIG. 4 uses electrodes that are concentrically arranged within each other, with the gun or accelerator portion arranged in tandem with the main portion. This type of construction, as opposed to the plate or rod construction of the exemplary FIGS. 2 and 3, is preferred for a number of reasons including ease of manufacture, relatively large surface area over which to spread the plasma in a ring shape as it moves through the switch, confinement of plasma radiation, confinement of air flow, confinement of acoustic noise, and minimization of self-inductance.

Here again certain parts shown in FIG. 4 have a direct correspondence to parts shown in FIGS. 1, 2A, 2B, 3A and 3B, and thus the description of such parts will not be repeated.

The preferred switch 62 comprises a housing 64 made of ceramic or other suitable electrical insulating material, and sufficiently strong and rugged enough to carry the remaining parts. In spaced relation to its rear or left end, the housing 64 carries structural and current conveying means 66 extending inwardly of the conical portion of the housing. The structure 66 may be in the form of a plurality of ribs or a perforated dish-shaped disc or the like. Inwardly of structural member 66, the housing 64 carries another structural and electrical member or set of members 68. Outboard or rearwardly of the main support 66, the switch 62 comprises fan means 70 of any suitable type to blow air through the switch, in a manner and for purposes described below. The support means 66 mount a main central electrode 72 at its inside center. This electrode 72 corresponds to both the electrode portions 42 and 26*a* of FIG. 3A. The main electrode 72 carries a spacer and insulator block 74 inwardly of the support means 66, and a gun or accelerating electrode 76 is mounted by the block 74 and held in a predetermined spaced relation to the left-hand portion of the main electrode 72. As is clear, the electrode 76 corresponds directly to the electrode 40 of the FIG. 3A embodiment with the gap 46 being provided in a radial direction under or inside of this tubular-shaped electrode 76. Accordingly, the trigger means 28, in the form of a metal protrusion on the main electrode 72 is mounted by both the block 74 and on and a part of the main electrode 72. The purpose of the circular pointed edge on the trigger 28 is to facilitate initiation of the spark between the trigger and electrode 76 by breaking down the air gap therebetween. For the same purpose, the block 74 may, optionally as needed in a particular embodiment, be provided with a row of relatively small air relief openings to prevent a low pressure condition from being created behind the trigger as the spark migrates to the right.

The electrodes 42 and 26*a* together in FIG. 3 and the main electrode 72 of the FIG. 4 embodiment each is a common electrode.

The housing 64, as shown, comprises a rear cylindrical portion, a central conical portion, and a front end reduced diameter thickened wall cylindrical portion. A tubular double wall electrode 78 is mounted in the front end of the front cylindrical housing portion. This electrode is provided with an electrode contact portion 81 for connection with the lead 22 to the PFN 18. This connection 22, as well as the connection between the load 30 and the conductor 66, and the lines 48 between the arc initiation circuit 44 and the two conductor supports 66 and 68, are all shown as dotted lines to indicate that the switch 62 may be located remotely from the PFN and the circuit 44.

The main central electrode 72 is supported and located relative to the tube 78 at its forward end by a structural ground 88.

Air is blown by the fan 70 through the housing 64 and over the outside of electrode 76 and between the main electrodes 78 and 72. This air serves two purposes, of cooling both sets of electrodes while the shot of plasma traverses the invention switch, and, just as importantly, as a purge between the arc pulses. That is, the high energy shot of plasma leaves behind it, after it dissipates within the main electrodes 72 and 78, ionized air and other charged particles. These ions must be removed, or at least are preferably removed between pulses, in order to assure proper operation of the switch in response to the next pulse supplied by the PFN. Thus, the air flow, in addition to cooling, purges out these ions to in effect "clean" the switch between pulses.

In order to further increase their useful life, and to provide safe operation, the electrodes 72 and 78 are made of a good conducting metal which will resist deterioration under exposure to the high electrical energies handled by the invention switch. These two portions, as well as the electrode 76 for the same reason, are preferably made of tungsten, or the like, metal. The main two electrodes 72 and 78 are further built to carry cooling water internally. Electrode 72 is in the form of an elongated pipe, and the electrode 78 is built in the form of a double-walled sleeve. Each electrode is provided with a supply of cooling water diagrammatically indicated at 80 and 82, and means are provided to vent the heated water and/or steam at the opposite end, such vents being indicated at 84 and 86, respectively. This structure can be somewhat simplified, under appropriated operating conditions, by providing a stationary jacket or quantity of water internally in one or both of these electrodes, which is then vented batch-wise rather than in a flowing system.

The front end of the accelerating or triggering electrode 76 is shown to be coplanar with the rear end of the main electrode 78. In tests of the invention, the momentum of the plasma or arc upon exiting from under the accelerating electrode 76 has been found to be more than sufficient to leap across a distance measured axially along the main electrode 72 between the front end of the electrode 76 and the rear end of the electrode 78. Thus, the configuration shown in FIG. 4 has additional flexibility in this regard when a specific embodiment is constructed for a specific environment or set of conditions of use.

Another advantage of the switch 62 is that all of the various parts thereof lend themselves to separate replacement as required after prolonged use. That is, if simply the main electrode 72 should deteriorate, only this part could be replaced, thus simplifying maintenance and increasing the total useful life of an invention switch.

As is evident, the electrical circuitry in switch 62 in FIG. 4 is functionally identical to that shown in FIG. 3A at a more conceptual level, with the structural portions 66 and 68 serving simply as another part of the various interconnecting wires. Thus this circuitry need be no further described in regard to FIG. 4, reference being had above.

While one embodiment of the invention has been described in detail above, it is to be understood that this detailed description is by way of example only, and the protection granted is to be limited only within the spirit of the invention and the scope of the following claims. For example, it is not intended that the invention apply only to arc switches that operate only in air at normal temperature and pressure. The invention may be applied to arcs in other gases and at pressures approaching a vacuum condition.

I claim:

1. A switch for closing, or completing, an electrical circuit to pass current that increases in value very abruptly wherein the switch is closed by means for injecting an electrical arc between the two electrodes of the switch, the combination comprising accelerating electrode means and main electrode means, means to mount said accelerating electrode means in tandem before said main electrode means, arc initiation means at one end of said accelerating electrode means for starting an arc at said one end and to permit motion of said arc towards the opposite end of said accelerating electrode means, and means to introduce electrical energy pulses to said main electrode means at the end thereof in closely spaced tandem relationship to said opposite end of said accelerating means, whereby a shot of plasma is produced at said one end of said main electrode means and on said moving arc from said accelerating means to thereby sweep said plasma over said main electrode means and to avoid any dwell of said plasma on said main electrode means.

2. The combination of claim 1 wherein said accelerating electrode means comprises a first electrode in spaced relation to a portion of a common electrode, and said main electrode means comprises a first main electrode in spaced relation to substantially the entire remaining portion of said common electrode, and wherein said first accelerating electrode and said first main electrode are in electrical and physical spaced relation to each other with a gap therebetween, said arc initiation means comprising trigger means at said one end of said first accelerating electrode and the adjacent portion of said common electrode, and said pulse introduction means introducing said pulses from said pulse source at the gap between said first main electrode and first accelerating electrode and to the adjacent portion of said common electrode at said gap.

3. The combination of claim 1, wherein said accelerating electrode means and said main electrode means each comprises a pair of spaced rods, with one electrode of each of said pairs comprising a common rod to each pair.

4. The combination of claim 1, wherein said accelerating electrode means and said main electrode means each comprises a pair of spaced plates, one plate of each of said pairs of plates being connected to each other to form a common electrode plate, and the mating plate of each of said pairs of plates being physically and electrically separate from each other.

5. The combination of claim 1, wherein said accelerating electrode means and said main electrode comprise a central main electrode member having a portion serving said accelerating electrode means and the remaining portion serving said main electrode means, said accelerating electrode means further comprising a cylindrical electrode member surrounding said portion of said central electrode, and said main electrode means further comprising a cylindrical main electrode member surrounding the remaining portion of said central electrode member, said second portion of said main electrode means and said accelerating electrode means being in tandem relation to each other.

6. The combination of claim 5, wherein said common electrode member comprises a hollow sleeve of tungsten and means to flow a coolant through the internal space of said hollow central electrode.

7. The combination of claim 5, wherein said main electrode comprises an annular hollow closed sleeve member, and means to flow a coolant through said sleeve member and from end to end thereof to keep said sleeve member cool, and said sleeve member comprising tungsten on that portion thereof in operative cooperation with said central electrode.

8. The combination of claim 5, and in addition fan means adapted to flow air through the length of said switch and between said main electrode and over the outside of said accelerating electrode.

9. The combination of claim 5, wherein said arc initiation means comprises a ring member mounted on said main electrode member in closely spaced relation to said one end of said accelerating electrode member.

10. The combination of claim 5, and in addition a dish-like mounting means mounted on said main electrode member at said one end thereof, a ceramic housing member mounted on a peripheral portion of said mounting means, and means to mount said cylindrical main electrode on said housing member.

11. The combination of claim 10, wherein said mounting means comprises a plurality of mounting ribs.

12. The combination of claim 10, wherein said mounting means comprises a perforated dish-like member.

13. A switch comprising:
means for generating a moving plasma, and
means for initiating a main plasma through the moving plasma to cause the main plasma to travel with the moving plasma.

14. A switch as in claim 13:
including a first electrode means and a second electrode means wherein said moving plasma is generated between the first electrode means and the second electrode means.

15. A switch as in claim 14:
including a third electrode means wherein said main plasma is initiated between the first electrode means and the third electrode means.

16. A method of limiting damage to electrodes caused by a main plasma in an arc type switch,
said method comprising the steps of
generating a moving plasma between electrodes, and
initiating a main plasma through the moving plasma to cause the main plasma to travel with the moving plasma.

17. The method of claim 16 wherein said moving plasma is initially generated at a low current, and
the current of the moving plasma is increased prior to initiation of said main plasma.

18. An arc type switch comprising:
a first electrode means;
a second electrode means having a first portion, a second portion and insulating means separating the first portion from the second portion, means for generating a moving plasma between said first electrode means and the first portion of said second electrode means and directing said moving plasma toward the second portion of said second electrode means, and
means for generating a main plasma between said first electrode means and the second portion of said second electrode means and into said moving plasma for moving the main plasma with said moving plasma.

19. An arc type switch as in claim 18 wherein said moving plasma generating means includes means for increasing the current of the moving plasma from a low initial value as said moving plasma approaches the second portion of said electrode means.

20. An arc type switch as in claim 19 wherein said switch is connected to a load and said main plasma produces a high current pulse through the load.

* * * * *